United States Patent [19]

Kaminaka et al.

[11] 4,394,699
[45] Jul. 19, 1983

[54] THIN-FILM MAGNETIC HEAD

[75] Inventors: Nobuyuki Kaminaka, Moriguchi; Kenji Kanai, Neyagawa; Norimoto Nouchi, Katano; Noboru Nomura, Kyoto, all of Japan

[73] Assignee: Matsushita Electric Industrial Co., Ltd., Japan

[21] Appl. No.: 236,307

[22] Filed: Feb. 20, 1981

[30] Foreign Application Priority Data

Feb. 21, 1980 [JP] Japan .................................. 55-21099

[51] Int. Cl.³ .......................... G11B 5/12; G11B 5/30; G11B 5/22
[52] U.S. Cl. ..................................... 360/113; 360/122
[58] Field of Search ............... 360/113, 112, 125, 126, 360/127, 122; 324/251, 249

[56] References Cited

U.S. PATENT DOCUMENTS

| | | | |
|---|---|---|---|
| 3,996,095 | 12/1976 | Ahn | 360/113 |
| 4,164,770 | 8/1979 | Jeffers | 360/113 |
| 4,225,892 | 9/1980 | Bassett | 360/113 |
| 4,242,710 | 12/1980 | Hempstead | 360/113 |
| 4,317,147 | 2/1982 | Daughenbaugh | 360/113 |

Primary Examiner—Robert M. Kilgore
Attorney, Agent, or Firm—Wenderoth, Lind & Ponack

[57] ABSTRACT

A thin-film magnetic head employing a magneto-resistive element (MR element), which comprises a substrate, a layer of MR element deposited on said substrate and a conductor layer for supplying said MR element with an electric current in the longitudinal direction thereof. The substrate has at least two crystal axes in the plane parallel to the surface on which said magnetoresistive element is disposed. The respective coefficients of thermal expansion in the directions of said two crystal axes are different from each other. The coefficients of thermal expansion in the directions of said two crystal axes, the orientations of said two crystal axes and the magnetostriction coefficient of the MR element are adjusted in a relationship whereby an internal stress is imparted due to the difference between the temperature during deposition of the MR element and the room temperature, and the thus imparted stress operates to provide the spins within the MR element with a tendency to be oriented in said longitudinal direction of the MR element.

9 Claims, 9 Drawing Figures

THIN-FILM MAGNETIC HEAD

BACKGROUND OF THE INVENTION

This invention relates to a thin-film magnetic head employing a magnetoresistive element.

In a thin-film magnetic head employing a magnetoresistive element (hereinafter referred to as MR element) 1 as shown in FIG. 1, the relationship between the strength of the signal magnetic field Hs and the resistivity variation of the MR element $\Delta\rho$ is non-linear on the whole, as shown in FIG. 2, even if spins within the MR element are perfectly ordered in the longitudinal direction. In order to avoid the generation of harmonic distortion in magnetoelectric transducing, a bias magnetic field $H_B$ is supplied so that the operating point is located in linear characteristic region such as a point P.

On the other hand, in case where spins within the MR element are not ordered in a prefered orientation, i.e., a longitudinal direction of the MR element, such as in a magnetically isotropic material in a extremely bad case, the relation between the resistivity variation of the MR element $\Delta\rho$ and the magnetic field strength H has quite large hysteresis, as shown in FIG. 3. In such condition the harmonic distortion, especially the second harmonic distortion exhibits a complicated variation with respect to the signal magnetic field. Therefore it is difficult to suppress the generation of the harmonic distortion.

Further it is more important to order the orientations of spins in case where the thin-film magnetic head has a multi-channel construction. Otherwise the respective characteristics of the channels are scattered from each other, as shown in FIG. 4, even if the optimum bias magnetic field is provided to each channel. This is quite inconvenient with a multi-channel magnetic head.

To order the spin orientation in the MR element, the induced anisotropy caused by performing deposition of the thin film of the MR element within a magnetic field, or the shape anisotropy has hitherto been utilized. The latter is based on the effect where if the MR element has a rectangular shape the length l and the width w of which are in the relationship where l/w>1, the spin orientation tends to be ordered in the longitudinal direction of the element.

However satisfactory ordering of the spin oreintation has not been obtained by the above-mentioned method.

SUMMARY OF THE INVENTION

It is an object of the present invention to provide a thin film magnetic head having an MR element wherein the spin orientation has improved ordering, so as to exhibit satisfactory characteristics in magnetoelectric transducing.

According to the present invention, a thin-film magnetic head comprises a substrate, a layer of magnetoresistive element deposited on said substrate, and a conductor layer for supplying an electric current in the longitudinal direction of said magnetoresistive element, wherein said substrate has, in the plane parallel to the surface on which said magnetoresistive layer is deposited, at least two crystal axes in the direction of which the respective coefficients of thermal expansion are different from each other. The relationship between the respective coefficients of thermal expansion in the direction of said two crystal axes, the orientations of said two axes to said longitudinal direction of the magnetoresistive element and the magnetostriction coefficient of the magnetoresistive element, are adjusted in the relationship whereby an internal stress is imparted due to the difference between the temperature during the deposition of the magnetoresistive element and the room temperature, and the thus imparted stress operates so as to provide the spins within the magnetoresistive element with a tendency to be oriented in said longitudinal direction of the magnetoresistive element.

DETAILED DESCRIPTION OF THE INVENTION

Figure 5:
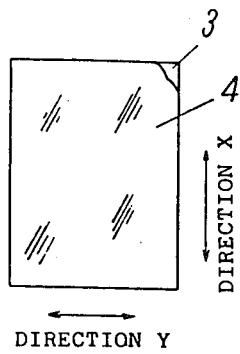
FIGS. 5 to 7 are plan views illustrating, according to the manufacturing process, a construction of a thin-film magnetic head embodying the present invention.
Figure 6:
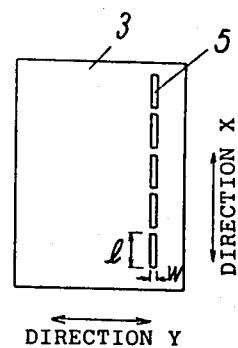
Figure 7:
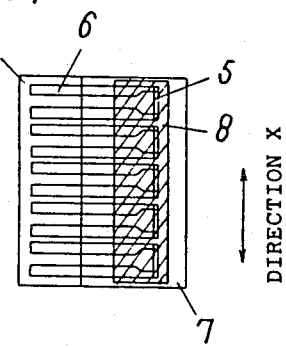

The construction of a thin-film magnetic head according to the invention is illustrated in FIGS 5 to 7 which are described with respect to the manufactuing process. Referring to FIG. 5, a numeral 3 denotes a substrate on which a ferromagnetic thin film 4 is deposited, for example, by vacuum evaporation using Fe-Ni alloy or Ni-Co alloy, etc., as a mother material. The ferromagnetic thin film 4 is etched onto a plurality of magnetoresistive elements (MR element) 5 of a rectangular shape, as shown in FIG. 6, by using a photolithography and an etching technique. The MR elements 5 are aligned in a direction X which is to be a track width direction of a magnetic head. Further, as shown in FIG. 7, there are provided conductor layers 6 for supplying an electric current to MR elements 5, and then an insulator layer 7 made of a material such as SiO, etc., is deposited. Lastly a supporting plate 8 of the same material as the substrate 3 or soda glass, etc., is mounted by adhering with a resin or glass of low melting temperature, etc.

The deposition of the ferromagnetic thin film is performed in a magnetic field of the direction X, so that the spin within the deposited film tends to be oriented in the direction X.

A feature of a thin-film magnetic head according to the invention is that the substrate 3 has, in the plane parallel to the surface on which the MR element 5 is provided, at least two crystal axes and the respective coefficients of thermal expansion in those directions differing from each other.

Since such crystal axes are generally perpendicular to each other, such case ⋯ simplicity in the following example for explaining the principle of the invention. Also, it is assumed that one of the crystal axes (which is referred to as a first crystal axis) is oriented in the direction X, for simplicity of explanation. Thus a direction Y as shown in FIGS. 5 to 6 denotes the orientation of the other crystal axis perpendicular to the first crystal axis. The coefficients of thermal expansion in the directions X and Y are represented by $\alpha 1$ and $\alpha 2$, respectively. The ferromagnetic thin film 4 is, for example, composed of a material having a negative magnetostriction coefficient $\lambda$. In such case the coefficients $\alpha 1$ and $\alpha 2$ are required to satisfy the relation that $\alpha 1 > \alpha 2$. The coefficient of thermal expansion of the ferromagnetic thin film 4 is represented by $\beta$.

In the condition that the substrate 3 and the deposited ferromagnetic thin film 4 are at the room termperature, the ferromagnetic thin film 4 is strained correspondingly to the relationship among the coefficients of thermal expansion $\alpha 1$, $\alpha 2$ and $\beta$, due to the difference between the temperature during deposition and the room temperature, so that an internal stress is set up therein. An anisotropic energy K due to the magnetostriction in such state is expressed by the formula $$K = -3/2 \lambda \sigma \cos^2 \theta$$

wherein $\lambda$ is magnetostriction coefficient under the condition of isotropic magnetostriction, $\sigma$ is an internal stress within the ferromagnetic thin film 4, which is represented as positive if it is the tensile stress and negative if compressive, and $\theta$ is an angle between the direction of saturation magnetization and the stress. A spin within the film 4 tends to have an orientation whereby the anisotropic energy comes to the minimum value.

If $\beta > \alpha 1 > \alpha 2$, in the direction Y is set up a larger tensile stress. Therefore the anisotropic energy reaches the minimum value under the condition that $\cos^2 \theta = 0$, i.e., $\theta = 90°$, because $\lambda$ is negative. Thus the spin tends to be oriented in the direction X.

If $\alpha 1 > \alpha 2 > \beta$, in the direction X there is set up a larger compressive stress. Therefore the anisotropic energy reaches the minimum value under the condition that $\cos^2 \theta = 1$, i.e., $\theta = 0°$. Thus the spin also tends to be oriented in the direction X.

While the above-mentioned example has been described in only the specified conditions of $\alpha 1$, $\alpha 2$, $\beta$ and $\lambda$, other conditions are also applicable provided that the stress set up within the ferrromagnetic thin film has specified relationship with the magnetostriction coefficient $\lambda$, which is determined from the above-mentioned formula.

If the magnetostriction coefficient $\lambda$ is zero, the above-mentioned effect of spin ordering can not be obtained. On the other hand if $\lambda$ is too large, an inverse magnetostriction is effected when the head is contacted with a magnetic recording medium, causing generation of undesirable noise.

Whether $\lambda$ should be positive or negative is determined in consideration of the following aspect.

Figure 8:
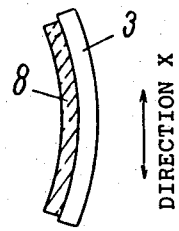
FIG. 8 is a sectional view illustrating a deflection of a thin-film magnetic head due to mounting of a supporting plate.

The thin film structure in FIG. 7 has deflection corresponding to difference between the coefficients of thermal expansion of the substrate 3 and the supporting plate 8, due to the difference between the temperature during adhering of the supporting plate 8 and the room temperature. For example, if the longitudinal direction of the supporting plate 8 is in the direction X, and the coefficient of thermal expansion of the supporting plate 8 is larger than that of the substrate 3, the deflection occurs with the supporting plate inside and has a larger magnitude in the direction X than in the direction Y, as shown in FIG. 8. Although the magnitude of the deflection is several $\mu m/10$ mm, it set up within the MR element 5 the compressive stress in the direction X. Thus if $\lambda$ is negative, this compressive stress has the effect such that the spin within the MR element is given the tendency of being oriented in the direction X. On the other hand, if $\lambda$ is positive, the spin is give the a tendency of being oriented in the direction Y.

Thus $\lambda$ is selected so that the above-mentioned deflection helps the spin within the MR element to be ordered in the direction X.

It is preferable to construct the length l and the width w of the MR element 5 in the relationship that $l/w > 1$, as shown in FIG. 6, because the shape anisotropy operates so as to order the spin orientation in the direction X.

The above-mentioned effect of the present invention can be obtained, even if between the substrate 3 and the MR element 5 are interposed other layers such as a thin film of high coercive force for supplying a bias magnetic field, a conductor layer for supplying a bias, or an insulator layer. Also the effect can be obtained if other layers are interposed between the MR element 5 and the supporting layer 8.

A more specific example of the present invention will be described in the following.

A single crystal plate of alumina was used for the substrate. The plate was prepared so as to have an axis parallel to a C axis and an axis perpendicular to the C axis in the plane parallel to the plate's surface on which the head composing layers were deposited. The single crystal of alumina exhibits the coefficients of thermal expansion of $53 \times 10^{-7}/C$ in the direction of C axis and $45 \times 10^{-7}/C$ in the direction perpendicular to the C axis and is suitable for the substrate because of its good wear performance.

As a mother material for deposition of the ferromagnetic thin film 86% Ni-14% Fe alloy was used. The deposited film has the negative magnetostriction coefficient and the coefficient of thermal expansion of $120 \times 10^{-7}/°C$. The substrate was formed and disposed so that the axis parallel to the C axis was located parallel to the direction X, and the deposition of the ferromagnetic thin film was performed by electron beam evaporation in the DC magnetic field of the direction X.

further processes as shown in FIGS. 6 to 7 were performed in the same manner as those shown in FIGS. 6 to 7 and then the front surface of the resultant device was subjected to final lapping.

Figure 9:
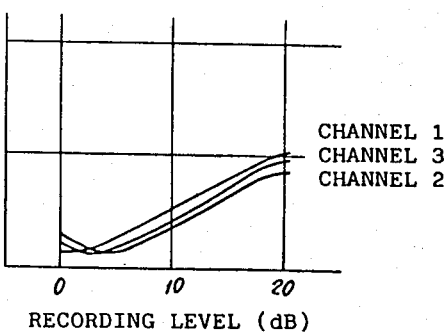
FIG. 9 is a graph showing the characteristics of second harmonic distortion of each channel of a multichannel thin-film magnetic head according to the present invention.

The characteristics of the thus completed device were measured in the manner such that the conductor layer 6 was connected with a driving circuit and was operated in the range of good linearity of response by supplying a bias magnetic field with a permanent magnet piece of Ba-Fe alloy which was located at the rear portion of the device. The resultant characteristics of second harmonic distortion are shown in FIG. 9.

Figure 1:
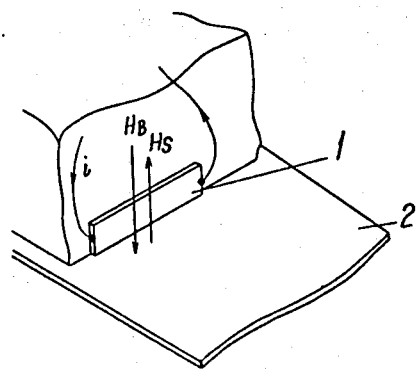
FIG. 1 is a schematic perspective view of a thin film magnetic head employing an MR element.
Figure 2:
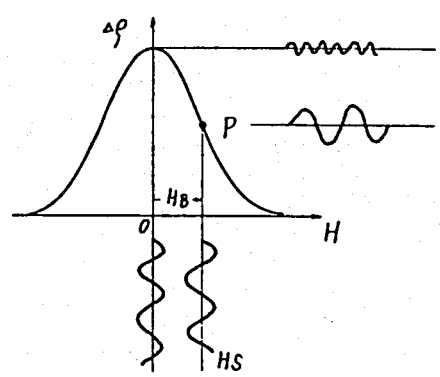
FIG. 2 is a graph showing the relation between the strength of applied magnetic field H and the variation of the resistivity $\Delta\rho$ of an MR element wherein the spin orientation is in good ordering.
Figure 3:
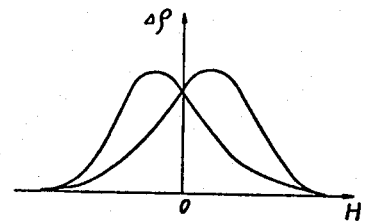
FIG. 3 is a graph showing the relation between the strength of applied magnetic field H and the resistivity variation $\Delta\rho$ of a MR element wherein the spin orientation is in disordering condition.
Figure 4:
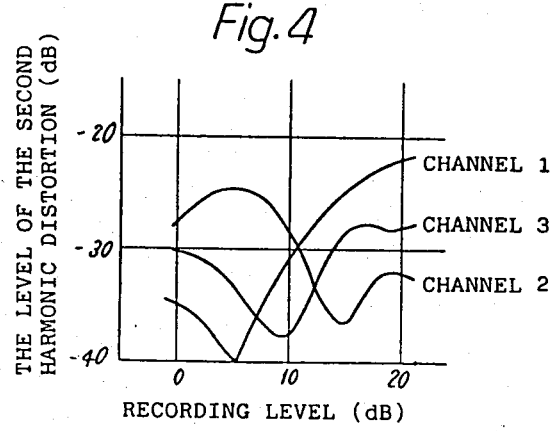
FIG. 4 is a graph showing the characteristics of second harmonic distortion of each channel of a conventional multichannel thin-film magnetic head.

As clearly understood from this figure, the level of the second harmonic distorsion was lower and the scattering of the characteristics among the channels were smaller than those of the conventional head as shown in FIG. 4. This means good ordering of spin orientation.

Further the output magnitude of reproduction was larger and the scattering thereof was smaller than in the conventional device.

As a material for the substrate, Be, Bi, graphite, CdS, Mg, Sb, quartz, TiO$_2$(rutile), Zn, etc., may be used other than the single crystal of alumina. In those materials crystal axes having different coefficients of thermal expansion are perpendicular to each other, so that it is easy to apply the idea of the present invention.

What is claimed is:

1. A thin-film magnetic head comprising a substrate, a layer of magnetoresistive element deposited on said substrate at a temperature other than at room termperature and a conductor layer for supplying said magnetoresistive element with an electric current in the longitudinal direction thereof, wherein:

said substrate comprises a single crystal material;

at least two crystal axes of said substrate material are in parallel with the surface on which said layer of magnetoresistive element is deposited, the coefficient of thermal expansion of the substrate being different in the directions of said crystal axes;

the orientations of said crystal axes and the coefficients of thermal expansion in said directions are in the relationship such that an internal stress is set up within said magnetoresistive element in parallel or perpendicular to said longitudinal direction of said element due to the difference between the temperature during the deposition of said element and room temperature; and the magnetostriction coefficient of said element is selected so that said set up stress has the effect of orienting the spins within said element in said longitudinal direction.

2. The thin-film magnetic head as claimed in claim 1, wherein said two crystal axes of the substrate are perpendicular to each other and one of them is parallel to said longitudinal direction of the magnetoresistive element.

3. The thin-film magnetic head as claimed in claim 2, wherein the coefficient of thermal expansion is larger in the direction of said crystal axis parallel to the longitudinal direction of the magnetoresistive element than in the direction of the other crystal axis, and the magnetostriction coefficient of the magnetoresistive element is negative.

4. The thin-film magnetic head as claimed in claim 2, wherein the coefficient of thermal expansion is smaller in the direction of said crystal axis parallel to the longitudinal direction of the magnetoresistive element than in the direction of the other crystal axis, and the magnetostriction coefficient of the magnetoresistive element is positive.

5. The thin-film magnetic head as claimed in claim 2, further comprising a supporting plate for covering the magnetoresistive element, which has a rectangular shape, the longitudinal direction of which is parallel to said longitudinal direction of the magnetoresistive element, wherein the magnetoresistive element has the magnetostriction coefficient such that a deflection of the substrate due to the difference between the coefficients of thermal expansion of the substrate and the supporting plate operates so as to make larger the tendency that the spins within the magnetoresistive element is oriented in said longitudinal direction of the magnetoresistive element.

6. The thin-film magnetic head as claimed in claim 5, wherein the coefficient of thermal expansion of the supporting plate is larger than that of the substrate and the magnetostriction coefficient of the magnetoresistive element is negative.

7. The thin-film magnetic head as claimed in claim 5, wherein the coefficient of thermal expansion of the supporting plate is smaller than that of the siubstrate and the magnetostriction coefficient of the magnetoresistive element is positive.

8. The thin-film magnetic head as claimed in claim 2, wherein said substrate comprises a material selected from the group consisting of a single crystal alumina, Be, Bi, graphite, CdS, Mg, Sb, quartz, TiO$_2$ (rutile) and Zn.

9. The thin-film magnetic head as claimed in claim 8, wherein said substrate comprises a single crystal alumina and the crystal axis parallel to the C axis is parallel to said longitudinal direction of the magnetoresistive element.

* * * * *